US007715087B2

(12) United States Patent
Hou et al.

(10) Patent No.: US 7,715,087 B2
(45) Date of Patent: May 11, 2010

(54) SEGMENT ELECTROPHORETIC DISPLAYS AND METHODS FOR THEIR MANUFACTURE

(75) Inventors: Jack Hou, Fremont, CA (US); Scott C-J Tseng, Fremont, CA (US); Zarng-Arh George Wu, Sunnyvale, CA (US); Rong-Chang Liang, Cupertino, CA (US)

(73) Assignee: Sipix Imaging, Inc., Fremont, CA (US)

( * ) Notice: Subject to any disclaimer, the term of this patent is extended or adjusted under 35 U.S.C. 154(b) by 0 days.

(21) Appl. No.: 11/408,622

(22) Filed: Apr. 21, 2006

(65) Prior Publication Data

US 2006/0256424 A1 Nov. 16, 2006

Related U.S. Application Data

(63) Continuation-in-part of application No. 10/421,172, filed on Apr. 22, 2003, now Pat. No. 7,079,303.

(60) Provisional application No. 60/375,282, filed on Apr. 23, 2002.

(51) Int. Cl.
G02B 26/00 (2006.01)
G09G 3/34 (2006.01)
G03G 17/04 (2006.01)

(52) U.S. Cl. .......................... 359/296; 345/107; 430/32

(58) Field of Classification Search ................. 359/296, 359/290, 291, 295, 322, 315, 316; 345/107, 345/84, 87, 88; 430/22, 30, 32, 311, 315, 430/321, 394
See application file for complete search history.

(56) References Cited

U.S. PATENT DOCUMENTS

| 3,668,106 | A | | 6/1972 | Ota |
| 4,466,701 | A | * | 8/1984 | Ogata et al. .................. 349/153 |
| 5,177,476 | A | | 1/1993 | DiSanto et al. |
| 5,324,603 | A | * | 6/1994 | Jin et al. ........................ 430/39 |

(Continued)

FOREIGN PATENT DOCUMENTS

EP 0 962 808 12/1999

(Continued)

OTHER PUBLICATIONS

Harbour et al "Subdivided Electrophoretic Display", *Xerox Disclosure Journal*, Xerox Corporation Stamford CT 4(6):705 XP 002123212 Nov. 1979.

(Continued)

*Primary Examiner*—Ricky L Mack
*Assistant Examiner*—Brandi N Thomas
(74) *Attorney, Agent, or Firm*—Howrey LLP

(57) ABSTRACT

The present invention relates to novel patterned embossing and patterned filling methods. Both methods are simple, reliable and cost effective ways for manufacturing the segment of signage electrophoretic displays. The displays prepared by the present invention requires only one patterned electrode layer. The undesired visible line traces are eliminated and the manufacture of the present displays does not involve the costly precision registration step used in the previously known assembly processes dealing with two patterned electrodes. Moreover, the electrophoretic fluid is present only in the patterned and switchable area of the display. This not only significantly reduces the material cost, but also improves the overall display quality by reducing defects and non-uniformity.

23 Claims, 5 Drawing Sheets

U.S. PATENT DOCUMENTS

| | | | |
|---|---|---|---|
| 6,144,361 | A | 11/2000 | Gordon et al. |
| 6,271,823 | B1* | 8/2001 | Gordon et al. ............... 345/107 |
| 6,459,418 | B1 | 10/2002 | Comiskey et al. |
| 6,515,790 | B2 | 2/2003 | Miyamoto et al. |
| 6,639,578 | B1 | 10/2003 | Comiskey et al. |
| 6,795,229 | B2 | 9/2004 | Liang et al. |
| 6,842,167 | B2 | 1/2005 | Albert et al. |
| 6,859,302 | B2 | 2/2005 | Liang et al. |
| 7,009,756 | B2* | 3/2006 | Kishi et al. ................. 359/296 |
| 7,079,303 | B2 | 7/2006 | Hou et al. |
| 2002/0113770 | A1* | 8/2002 | Jacobson et al. ............ 345/107 |
| 2004/0227985 | A1 | 11/2004 | Kishi et al. |
| 2004/0263947 | A1 | 12/2004 | Drzaic et al. |
| 2005/0007336 | A1* | 1/2005 | Albert et al. ................ 345/107 |
| 2005/0012981 | A1 | 1/2005 | Miura et al. |
| 2005/0174321 | A1 | 8/2005 | Ikeda et al. |
| 2005/0179643 | A1 | 8/2005 | Matsuura et al. |

FOREIGN PATENT DOCUMENTS

| | | |
|---|---|---|
| WO | WO 01/67170 | 9/2001 |

OTHER PUBLICATIONS

Allen, K. (Oct. 2003). Electrophoretics Fulfilled. *Emerging Displays Review: Emerging Display Technologies, Monthly Report—October* 2003, 9-14.

Bardsley, J.N. & Pinnel, M.R. (Nov. 2004) Microcup™ Electrophoretic Displays. *USDC Flexible Display Report*, 3.1.2. pp. 3-12 - 3-16.

Chaug, Y.S., Haubrich, J.E., Sereda, M. And Liang, R.C. (Apr. 2004). Roll-to-Roll Processes for the Manufacturing of Patterned Conductive Electrodes on Flexible Substrates. *Mat. Res. Soc. Symp. Proc.*, vol. 814, I9.6.1.

Chen, S.M. (Jul. 2003) The Applications for the Revolutionary Electronic Paper Technology. *OPTO News& Letters*, 102, 37-41. (in Chinese, English abstract attached).

Chen, S.M. (May 2003) The New Applications and the Dynamics of Companies. *TRI.* 1-10. (In Chinese, English abstract attached).

Chung, J., Hou, J., Wang, W., Chu, L.Y., Yao, W., & Liang, R.C. (Dec. 2003). Microcup(R) Electrophoretic Displays, Grayscale and Color Rendition. *IDW*, AMD2/EP1-2, 243-246.

Ho, Candice. (Feb. 1, 2005) *Microcupt® Electronic Paper Device and Applicaiton*. Presentation conducted at USDC 4th Annual Flexible Display Conference 2005.

Ho, C.,& Liang, R.C. (Dec. 2003). *Microcup( R) Electronic Paper by Roll-to-Roll Manufacturing Processes*. Presentation conducted at FEG, Nei-Li, Taiwan.

Hou, J., Chen, Y., Li, Y., Weng, X., Li, H. And Pereira, C. (May 2004). Reliability and Performance of Flexible Electrophoretic Displays by Roll-to-Roll Manufacturing Processes. *SID Digest*, 32.3, 1066-1069.

Lee, H., & Liang, R.C. (Jun. 2003) SiPix Microcup(R) Electronic Paper—an Introduction. *Advanced Display*, Issue 37, 4-9 (in Chinese, English abstract attached).

Liang, R.C. (Feb. 2003) *Microcup( R) Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.

Liang, R.C. (Apr. 2004). *Microcup Electronic Paper by Roll-to-Roll Manufacturing Process*. Presentation at the Flexible Displays & Electronics 2004 of Intertech, San Fransisco, California, USA.

Liang, R.C. (Oct. 2004) *Flexible and Roll-able Display/Electronic Paper—A Technology Overview*. Paper presented at the METS 2004 Conference in Taipie, Taiwan.

Liang, R.C., (Feb. 2005) *Flexible and Roll-able Displays/Electronic Paper—A Brief Technology Overview*. Flexible Display Forum, 2005, Taiwan.

Liang, R.C., Hou, J., Chung, J., Wang, X., Pereira, C., & Chen, Y. (2003). Microcup(R) Active and Passive Matrix Electrophoretic Displays by a Roll-to-Roll Manufacturing Processes. *SID Digest*, 20.1.

Liang, R.C., Hou, J., & Zang, H.M. (Dec. 2002) Microcup Electrophoretic Displays by Roll-to-Roll Manufacturing Processes. *IDW*, EP2-2, 1337-1340.

Liang, R.C., Hou, J., Zang, H.M., & Chung, J. (Feb. 2003). *Passive Matrix Microcup( R) Electrophoretic Displays*. Paper presented at the IDMC, Taipei, Taiwan.

Liang, R.C., Hou, J., Zang, H.M., Chung, J., & Tseng, S. (2003). Microcup(R) displays : Electronic Paper by Roll-to-Roll Manufacturing Processes. *Journal of the SID*, 11(4), 621-628.

Liang, R.C., Zang, H.M., Wang, X., Chung, J. & Lee, H., (Jun./Jul. 2004) << Format Flexible Microcup (R) Electronic Paper by Roll-to-Roll Manufacturing. Process>>, Presentation conducted at the 14th FPD Manufacturing Technology EXPO & Conference.

Liang, R.C., & Tseng, S. (Feb. 2003). *Microcup( R) LCD, an New Type of Dispersed LCD by a Roll-to-Roll Manufacturing Process*. Paper presented at the IDMC, Taipei, Taiwan.

Nikkei Microdevices. (Dec. 2002) Newly-Developed Color Electronic Paper Promises—Unbeatable Production Efficiency. *Nikkei Microdevices*, 3. (in Japanese, with English translation).

Wang, X., Kiluk, S., Chang, C., & Liang, R.C. (Feb. 2004). *Mirocup( R) Electronic Paper and the Converting Processes. ASID*, 10.1.2-26, 396-399, Nanjing, China.

Wang, X., Kiluk, S., Chang, C., & Liang, R.C., (Jun. 2004) Microcup® Electronic Paper and the Converting Processes. *Advanced Display*, Issue 43, 48-51.

Wang, X., Li, P., Sodhi, D., Xu, T. And Bruner, S. et al., (Feb. 2006) *Inkjet Fabrication of Multi-Color Microcup® Electrophorectic Display*. the Flexible Microelectronics & Displays Conference of U.S. Display Consortium.

Zang, H.M. (Feb. 2004). *Microcup Electronic Paper*. Presentation conducted at the Displays & Microelectronics Conference of U.S. Display Consortium, Phoenix, Arizona, USA.

Zang, H.M. (Oct. 2003). *Microcup( R) Electronic Paper by Roll-to-Roll Manufacturing Processes*. Presentation conducted at the Advisory Board Meeting, Bowling Green State University, Ohio, USA.

Zang, H.M.Hou, Jack, (Feb. 2005) *Flexible Microcup® EPD by RTR Process*. Presentation conducted at $2^{nd}$ Annual Paper-Like Displays Conference, Feb. 9-11, 2005, St. Pete Beach, Florida.

Zang, H.M, Hwang, J.J., Gu, H., Hou, J., Weng, X., Chen, Y., et al. (Jan. 2004). Threshold and Grayscale Stability of Microcup (R) Electronic Paper. *Proceeding of SPIE-IS& T Electronic Imaging, SPIE* vol. 5289, 102-108.

Zang, H.M., & Liang, R.C. (2003) Microcup Electronic Paper by Roll-to-Roll Manufacturing Processes. *The Spectrum*, 16(2), 16-21.

\* cited by examiner

SEGMENT ELECTROPHORETIC DISPLAYS AND METHODS FOR THEIR MANUFACTURE

CROSS-REFERENCE TO RELATED APPLICATION

This application is a continuation-in-parts of U.S. Ser. No. 10/421,172, filed Apr. 22, 2003; now U.S. Pat. No. 7,079,303 which claims benefit of Provisional Application 60/375,282, filed Apr. 23, 2002; the contents of both are incorporated herein by reference in their entirety.

BACKGROUND OF THE INVENTION

Field of the Invention

The present invention is directed to novel patterned embossing and patterned filling methods and the improved segment displays prepared therefrom.

The electrophoretic display (EPD) is a non-emissive device based on the electrophoresis phenomenon of charged pigment particles suspended in a solvent. The display usually comprises an array of cells sandwiched between two electrode plates, where at least one of the electrode plates is transparent. The cells are filled with a suspension composed of a colored solvent or solvent mixture having charged pigment particles dispersed therein. When a voltage difference is imposed between the two electrode plates, the pigment particles migrate to one side or the other, according to the polarity of the voltage difference. As a result, either the color of the pigment or the color of the solvent can be seen from the transparent viewing side.

Segment electrode displays are commonly used in digital clocks, signage boards, e-signs, price tags and the like. In constructing the segment displays, ITO (indium tin oxide) electrodes are usually used at least on the viewing side because of their high transparency. A common problem with this type of segment displays is that the connecting lines to the electrically active segments may be visible. One possible approach to hide the connecting lines in a segment display is to use patterned electrodes on both sides. With precision registration of the two patterned electrode layers, the non-overlapping area becomes inactive and only the area with overlapping electrodes is switchable. However, the need for an additional patterned ITO electrode not only results in a significantly higher material cost, but also a lower throughput or yield because of the need for precision registration. Moreover, the electrophoretic fluid in the non-active area is not functional and may actually be the source of display defects and non-uniformity.

Therefore, there is still a need for improved segment electrode displays which may be manufactured efficiently at low cost.

SUMMARY OF THE INVENTION

The first aspect of the invention is directed to a manufacturing process for a segment or signage display which process comprises pattern-wise embossing on an electrode layer pre-coated with an embossable or moldable resin composition to form microcups in an area which defines the segments of the display.

The second aspect of the invention is directed to a manufacturing process for a segment or signage display which process comprises (1) embossing on an electrode layer pre-coated with an embossable or moldable resin composition to produce microcups, followed by (2) pattern-wise filling an electrophoretic fluid into microcups in an area which defines the segments of the display.

The third aspect of the invention is directed to a segment or signage electrophoretic display which comprises a non-patterned or common electrode, a patterned electrode, and a plurality of cells sandwiched between the two electrode layers. The cells in an area having a pattern corresponding to that of the patterned electrode plate, are filled with charged pigment particles dispersed in a dielectric solvent or solvent mixture. The cells may also be individually sealed with a sealing layer, preferably a polymeric layer. In one specific embodiment, the non-patterned or common electrode is transparent and is on the viewing side.

The fourth aspect of the invention is directed to an electromagnetophoresis display which comprises an electrode layer and a substrate layer and a plurality of cells sandwiched between the two layers. The cells in a patterned area are filled with pigment particles which are both charged and magnetized and dispersed in a dielectric solvent or solvent mixture. The cells may also be individually sealed with a sealing layer, preferably a polymeric layer. In one specific embodiment, the substrate layer is transparent and is on the viewing side. Alternatively, the cells in the patterned area may be filled with magnetic (but not necessarily charged) pigment particles and in this case, the cells are sandwiched between two substrate layers.

The fifth aspect of the invention is directed to a display of the third or fourth aspect of the invention wherein the non-patterned area is color-matched to the Dmax or Dmin of the patterned area.

Both methods of the first and second aspects of the invention are simple, reliable and cost effective ways for manufacturing the various displays. The segment of signage display of the present invention requires only one patterned electrode layer, preferably on the non-viewing side. The undesired visible line traces are eliminated and the manufacture of the present displays does not involve the costly precision registration step used in the previously known assembly processes dealing with two patterned electrodes. Moreover, the electrophoretic fluid is present only in the patterned and switchable area of the present display. This not only significantly reduces the material cost, but also improves the overall display quality by reducing defects and non-uniformity.

DETAILED DESCRIPTION OF THE INVENTION

I. Definitions

Unless defined otherwise in this specification, all technical terms are used herein according to their conventional definitions as they are commonly used and understood by those of ordinary skill in the art.

The term "microcup" refers to the cup-like indentations created by a microembossing process or the photolithography method as disclosed in co-pending U.S. patent application Ser. No. 09/518,488, filed Mar. 3, 2000 (corresponding to WO 01/67170), the content of which is incorporated herein by reference.

The term "cell", in the context of the present invention, is intended to mean the single unit formed from a sealed microcup. The cells are filled with pigment particles dispersed in a solvent or solvent mixture. The pigment particles may be charged, or magnetized or both.

The term "viewing side" refers to the side of a cell seen by the viewer whereas the term "non-viewing" side refers to the side opposite from the viewing side.

Figure 1:
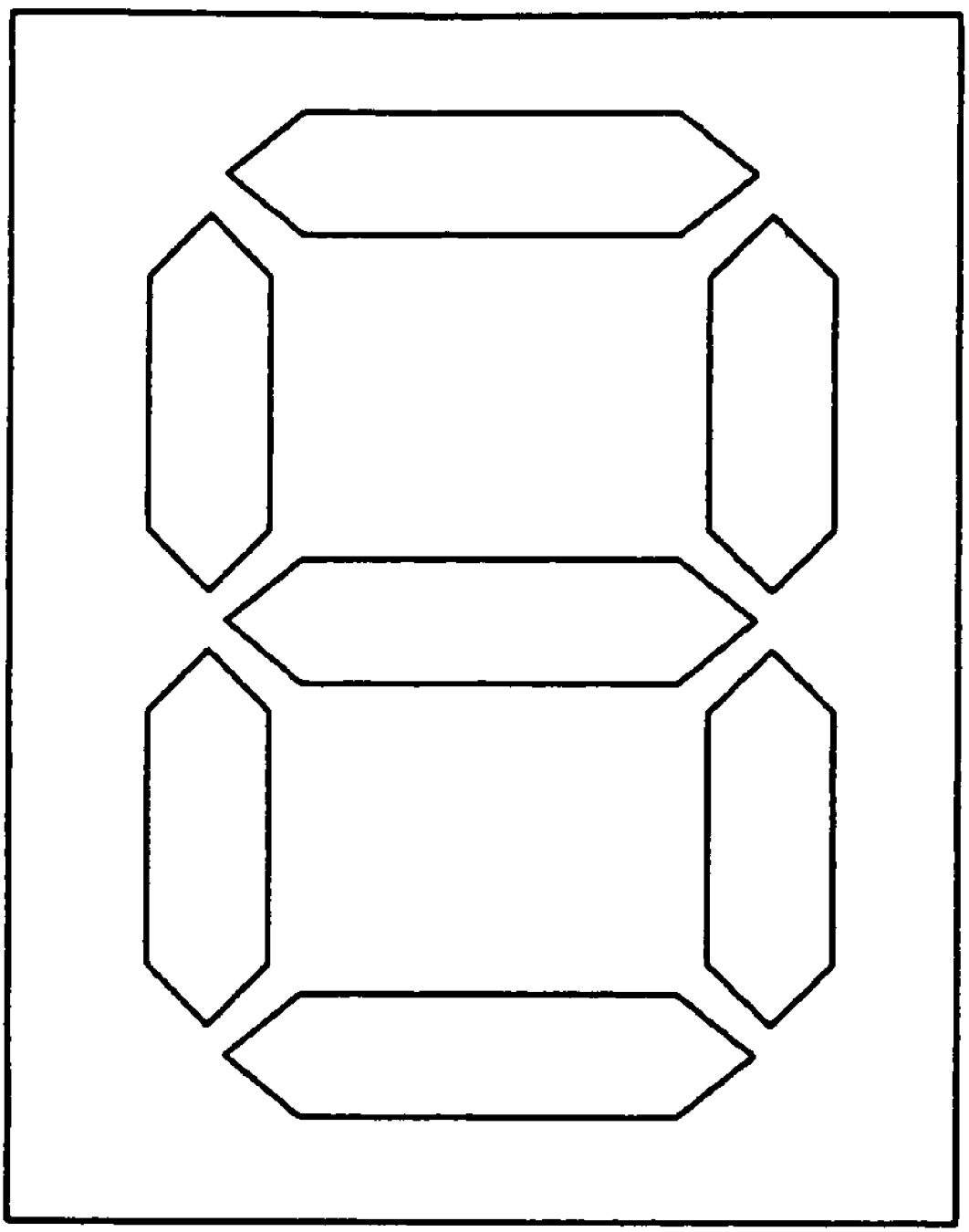
FIG. 1 depicts a typical numerical segment display.

The term "patterned area" refers to an area of any shape and size on the display that is potentially active (i.e., the charged particles in the cells in the area migrate to one electrode plate or the other depending on the polarity of the voltage difference). The numerical display as shown in FIG. 1 is a typical pattern used in digital clocks, signage boards, e-signs, e-bulletins, price tags and the like. The term "non-patterned area" refers to the area outside the patterned area.

It is noted that the "patterned" area may be referred to as the "active" area whereas the "non-patterned" area may be referred to as the "inactive" area.

The term "pattern-wise" is used to describe a process step which is carried out to define a patterned area or is carried out within a patterned area.

The term "Dmax" refers to the maximum optical density of the two contrast colors of the display.

The term "Dmin" refers to the minimum optical density of the two contrast colors of the display.

II. Electrophoretic Display

The first aspect of the invention is directed to a manufacturing process for an electrophoretic display which process comprises forming segmented arrays of microcups by pattern-wise embossing on an electrode layer precoated with an embossable or moldable resin composition. The invention is also directed to a display comprising patterned area and non-patterned area wherein said patterned area comprises electrophoretic cells which are filled with an electrophoretic fluid comprising charged pigment particles dispersed in a solvent or solvent mixture.

Figure 2A:
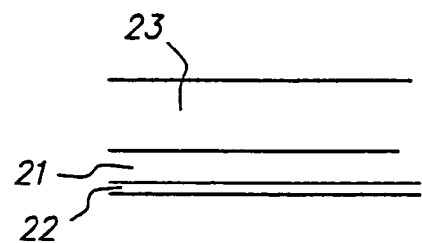
FIGS. 2A-2E illustrate the patterned embossing process.
Figure 2B:
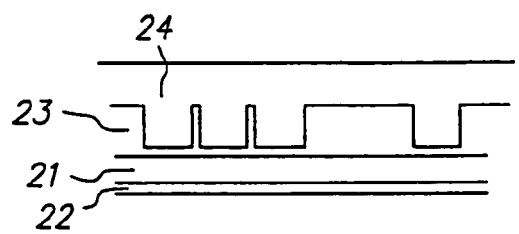

As shown in FIG. 2A, a transparent conductive substrate is formed of an electrode layer (21) on a substrate such as polyethylene terephthalate (PET) or polycarbonate (PC) film (22). A layer of an embossable or moldable composition comprising a thermoplastics or thermoset precursor (23) is then coated on the electrode layer (21). The thermoplastics or thermoset precursor layer is embossed by a patterned male mold (24) comprising the male counterpart of the microcup arrays (see FIG. 2B) at a temperature higher than the glass transition temperature of the thermoplastics or thermoset precursor layer.

The segment-patterned male mold may be prepared by a diamond turn or a lithographic process according to the method as disclosed in WO 01/67170.

The thermoplastics or thermoset precursor for the preparation of the microcups may be a multifunctional acrylate or methacrylate, vinylether, epoxide, oligomers or polymers thereof, or the like. Multifunctional acrylate and oligomers or polymers thereof are the most preferred. A combination of a multifunctional epoxide and a multifunctional acrylate is also useful to achieve desirable physico-mechanical properties. A crosslinkable oligomer imparting flexibility, such as polyurethane diacrylate, polyester diacrylate or polybutadiene diacrylate, is usually also added to improve the flexure resistance of the embossed microcups. The composition may contain an oligomer, monomer, polymer or additives.

The glass transition temperatures (or Tg) for this class of materials usually range from about −70° C. to about 150° C., preferably from about −20° C. to about 50° C. The microembossing process is typically carried out at a temperature higher than the Tg. A heated patterned male mold or housing substrate against which the mold presses may be used to control the embossing temperature and pressure.

Figure 2C:
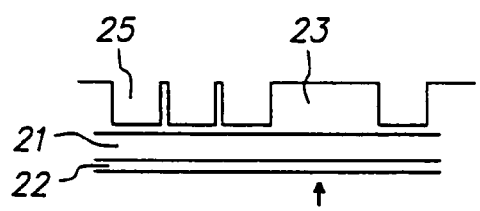

The segment-patterned mold is released (FIG. 2C) during or after the precursor layer is hardened to reveal microcups (25) in a patterned area (from the top view, such as the one shown in FIG. 1). The hardening of the precursor layer may be accomplished by cooling, cross-linking by radiation, heat, moisture or solvent evaporation. If the curing of the thermoset precursor is accomplished by UV radiation, UV may radiate through the transparent electrode layer from the bottom side (indicated by β). Alternatively, UV lamps may be placed inside the patterned mold. In this case, the mold must be transparent to allow the UV light to radiate through the patterned male mold onto the thermoset precursor layer.

In general, the microcups can be of any shape, and their sizes and shapes may vary. The microcups may be of substantially uniform size and shape in one system. However, in order to maximize the optical effect, microcups having a mixture of different shapes and sizes may be produced. The openings of the microcups may be round, square, rectangular, hexagonal or any other shapes. The partition area between the openings is preferably kept small in order to achieve a high color saturation and contrast while maintaining desirable mechanical properties. Consequently, the honeycomb-shaped opening is preferred over, for example, the circular opening.

For reflective electrophoretic displays, the dimension of each individual microcup may be in the range of from about $10^2$ to about $5 \times 10^5$ μm$^2$, preferably from about $10^3$ to about $5 \times 10^4$ μm$^2$. The depth of the microcups is in the range of about 3 to about 100 microns, preferably from about 10 to about 50 microns. The ratio of opening to total area is in the range of from about 0.3 to about 0.95, preferably from about 0.4 to about 0.9. The distances of the openings usually are in the range of from about 15 to about 450 microns, preferably from about 25 to about 300 microns, from edge to edge of the openings.

It is preferred that the thermoplastics or thermoset precursor material which forms the non-patterned (or inactive) area of the display is color-matched to the Dmin or Dmax of the segment-patterned area. Matching the color of the non-patterned area to that of the Dmax of the patterned area is the most preferred.

Figure 2D:
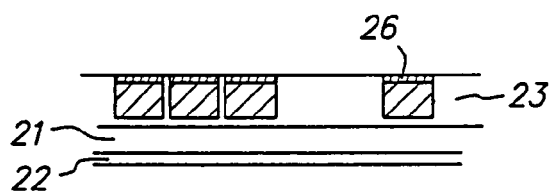

The resultant microcups are then filled with an electrophoretic composition comprising charged pigment particles dispersed in a dielectric solvent and sealed with a sealing layer (26) (FIG. 2D). The electrophoretic composition is prepared according to methods known in the art.

The sealing of the microcups may be accomplished in a number of ways. A preferred approach is to disperse a radiation curable, preferably UV curable composition into an electrophoretic fluid containing charged pigment particles dispersed in a colored dielectric solvent.

Useful sealing compositions may comprise a crosslinkable thermoset precursor such as polyvalent acrylate or methacrylate, cyanoacrylate, polyvalent vinyl including vinylbenzene, vinylsilane and vinylether, polyvalent epoxide, polyvalent isocyanate, polyvalent allyl, and oligomers or polymers containing the above-mentioned crosslinkable functional groups, or the like. Polymers particularly thermoplastic elastomers, surfactants, photoinitiators, crosslinkers, vulcanizers, colorants and fillers may also be added in the sealing composition to improve the quality of the sealing layer.

The UV curable composition is immiscible with the dielectric solvent and has a specific gravity lower than that of the dielectric solvent and the pigment particles. The two components, UV curable composition and the electrophoretic fluid, are thoroughly blended by, for example, an in-line mixer and immediately coated onto the microcups with a coating mechanism, such as Myrad bar, gravure, doctor blade, slot coating or slit coating. If desired, excess fluid is scraped away by a wiper blade or a similar device. A small amount of a weak solvent or solvent mixture such as heptane, isopropyl acetate, isopropanol, methanol or a mixture thereof with an aqueous solution may be used to clean, if desired, the residual electrophoretic fluid on the top surface of the partition walls of the microcups. Volatile organic solvents may be used to control the viscosity and coverage of the electrophoretic fluid. The thus-filled microcups are then dried and the UV curable composition phase separates and floats to the top of the electrophoretic fluid. The microcups may be sealed by curing the supernatant UV curable layer during or after the phase separation. UV or other forms of radiation such as visible light, IR and electron beam may be used to cure and seal the microcups. Alternatively, heat or moisture may also be employed to cure and seal the microcups, if a heat or moisture curable composition is used.

A preferred group of dielectric solvents exhibiting desirable density and solubility discrimination against acrylate monomers and oligomers are halogenated, preferably perfluorinated solvents and their derivatives. Surfactants may be used to improve the coating quality and adhesion properties. Useful surfactants include the FC™ surfactants from 3M Company, Zonyl™ fluorosurfactants from DuPont, fluoroacrylates, fluoromethacrylates, fluoro-substituted long chain alcohols, perfluoro-substituted long chain carboxylic acids and derivatives thereof.

Alternatively, the electrophoretic fluid and the sealing composition may be coated sequentially onto the microcups. Thus, the sealing of the microcups may be accomplished by overcoating a thin layer of sealing composition that is not miscible with the dielectric solvent and preferably is lighter than the dielectric solvent. The sealing composition is then hardened on the top surface of the electrophoretic fluid by, for example, solvent evaporation or curing by radiation, heat, moisture or interfacial reaction. Useful sealing compositions are those given above. Interfacial polymerization followed by UV curing is very beneficial to the sealing process. In this case, intermixing between the electrophoretic layer and the overcoat is significantly suppressed by the formation of a thin barrier layer at the interface by interfacial polymerization. The sealing is then completed by a post-curing step, preferably by UV radiation. To further reduce the degree of intermixing, it is highly desirable that the specific gravity of the overcoating is significantly lower than that of the electrophoretic fluid. Volatile organic solvents may be used to adjust the viscosity and the thickness of the coating. When a volatile solvent is used in the overcoat, it is preferred that it is immiscible with the dielectric solvent. The two-step overcoating process is particularly useful when the dye used is at least partially soluble in the thermoset precursor.

The sealing layer preferably forms a contiguous film on the electrophoretic fluid and is in intimate contact with both the fluid and the surface of the walls of the cells that are not covered by the fluid. The sealing layer may also extend over the top of the side walls of the cells.

Figure 2E:
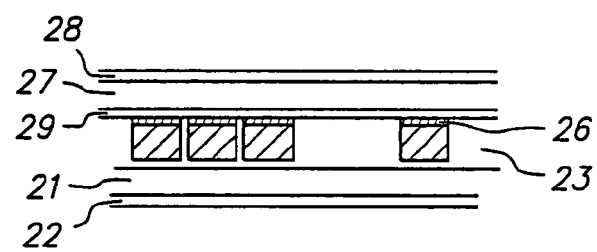

The sealed microcups are then laminated with a second electrode layer (27) (FIG. 2E). One side of the second electrode layer is adhered to a substrate (28) such as PET, PC, polyethylene naphthalate (PEN), polyimide, polysulfone, polyether, polycyclic olefin, epoxy resin, phenolic resin or their composites, and the other side is optionally pre-coated with an adhesive layer (29) which may be a pressure sensitive adhesive, a hot melt adhesive, a heat, moisture or radiation curable adhesive.

At least one of the two conductive layers (21 and 27) is a segment-patterned electrode layer having trace for connection to driving circuitry. Since embossing with precise registration is relatively more difficult to control in a roll-to-roll process, it is preferable that a non-patterned or common electrode layer is used during the embossing step. In other words, in FIG. 2, a non-patterned or common electrode (21) is used in the patterned embossing step. A patterned electrode (27) is then laminated with registration onto the patterned microcup arrays to complete the construction of the segment display panel after the microcups are filled with electrophoretic fluid and sealed.

Most preferably, a transparent, non-patterned or common electrode layer such as ITO is used on the viewing side. The substrate and the electrode layer on the non-viewing side may be colored or opaque.

The electrode layer on the non-viewing side may further comprise via holes in the active, patterned area. The electrode layer on the non-viewing side may also comprise traces on the surface opposite to electrophoretic cells to connect the via holes and the driver circuitry.

Figure 3A:
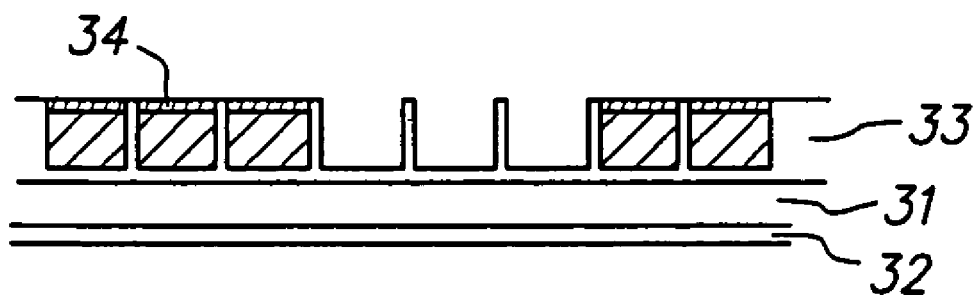
FIGS. 3A-3B illustrate the patterned filling process.
Figure 3B:
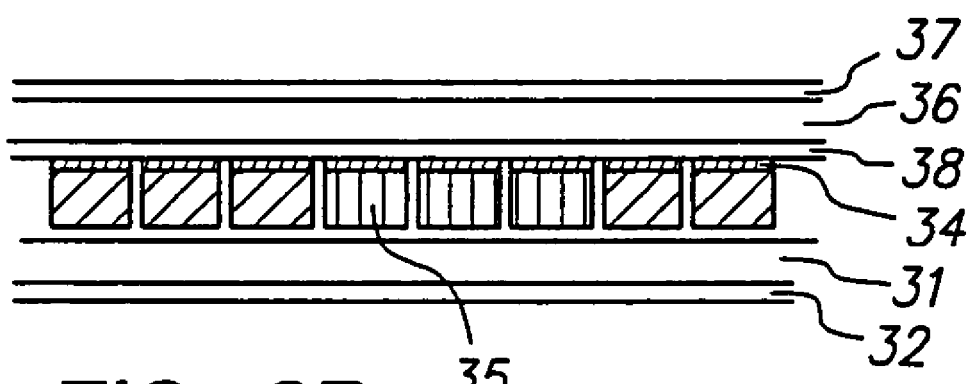

The second aspect of the invention is directed to a manufacturing process for a segment electrophoretic display which process comprises forming the active segments by patternwise filling the electrophoretic fluid into microcups. The process is illustrated in FIGS. 3A-3B. An array of microcups are prepared by either microembossing or lithographic methods as described in WO 01/67170. In contrast to the segment-pattern mold process, the microcups in this case are formed contiguously throughout the entire thermoplastics or thermoset layer (33). The resulting microcups in a patterned area are then filled with an "active" electrophoretic fluid (FIG. 3A) by methods such as screen printing, gravure printing, inkjet printing or the like. A sealing layer (34) is formed on the filled or printed microcups in the patterned area by one of the sealing methods disclosed above. The "active" electrophoretic dispersion, in the context of the present invention, is a suspension of charged pigment particles dispersed in a dielectric solvent or solvent mixture. The patterned area in which the microcups are filled with the active electrophoretic dispersion is referred to as the patterned (or active) area.

The remaining microcups in the "non-patterned" (or inactive) area are then filled or coated with an "inactive" composition (35) which may be color-matched to the color of the Dmax or Dmin of the patterned area. Either solid or liquid inactive compositions may be used. Useful materials for the inactive composition may include, but are not limited to, polymers, low molecular weight organic or inorganic compounds, organic and inorganic particulates or crystalline materials, latexes or polymer dispersions and mixtures or composites thereof.

In one of the preferred embodiments of this invention, the inactive composition comprises an organic polymer, a light scattering particle such as $TiO_2$, $CaCO_3$ or silica, and a dye or pigment to match the color. The inactive composition may be dispersed or dissolved in a solvent that is a poor solvent (such as water, isopropanol, methanol or MEK) for the sealing material, and filled into or coated onto the microcups in inactive areas and dried. Excess of the inactive fluid may be scraped or wiped away by, for example, a doctor blade. The inactive fluid may be transparent or opaque. To hide the connecting trace underneath the inactive areas, an opaque inactive composition is preferred.

After all microcups are filled and sealed (FIG. 3B), an electrode layer (36) on a substrate (37) is laminated over the sealed microcups optionally with an adhesive (38). In another preferred embodiment, the inactive composition may also function as adhesive between the second electrode layer (36) and the filled microcups. In a further preferred embodiment of this invention, the second electrode layer (36) is the segment-patterned electrode on the non-viewing side and is laminated with registration to the patterned filled microcup arrays. In this case, the substrate (37) may also be colored or blackened to improve the contrast ratio and the cosmetic appearance.

Alternatively, the patterned filling process may also carried out by first filling the microcups in the entire area with an inactive composition which can be removed or washed away later by a developer used for the positively working photoresist, and coating onto the filled microcups a positively working photoresist. The closed microcups in the patterned area are then opened by imagewise exposure, followed by developing the resist and removing the inactive composition during or after the resist development process. The opened microcups in the patterned area are then filled with an electrophoretic composition and sealed by one of the sealing processes described above.

Suitable materials for the inactive composition preferably are those that can be readily removed or washed out of the microcups using resist developer solution, an aqueous or non-aqueous solvent or solvent mixture that does not adversely affect or react with the thermoset or thermoplastic microcup material or the positive photoresist. Particularly suitable materials for the inactive composition may include, but are not limited to, inorganic, organic, organometallic, and polymeric materials and the photoresist itself. Non-film-forming particulates are especially useful. The inactive materials should be soluble or dispersible in the cleaning solution.

Nonexclusive examples of inactive materials useful in this case may also include water-dispersible or soluble polymers such as AQ branched polyesters (Eastman Chemical Company), Carboset® Polymers (BF Goodrich), polyvinylpyrrolidone, poly(vinyl alcohol), poly(4-vinyl phenol), novolac resin and their copolymers. More preferable inactive materials are non-film forming particles, such as latexes of PMMA, polystyrene, polyethylene and their carboxylated copolymers and their corresponding salts, wax emulsions, colloidal silica, titanium oxide, calcium carbonate dispersions and mixtures thereof. Particularly preferable inactive materials include aqueous dispersions of ionomers of ethylene copolymers such as ACqua220™, ACqua240™, and ACqua250™ (Honeywell, N.J.) ACqua220™ and 250 can be removed with conventional alkaline cleaners including the developer used for typical novolac positive photoresists. ACqua240™ can be removed with hot or cold water. The dispersability or solubility of the inactive materials, particularly the particulate inactive materials, may be enhanced by the use of additives such as surfactants, dispersing agents, KOH, triethanolamine, aromatic or aliphatic bases, aromatic or aliphatic acids, pre-exposed positive novolac photoresists and water soluble polymers such as polyethylene glycol, polyvinyl alcohol, polyvinylpyrrolidone, polyvinylpyridine, polyacrylic acid, polymethacrylic acid, polyacrylamide or copolymers thereof.

Alternatively, a negatively working resist or a photo-crosslinkable/photopolymerizable composition may be used to fill the entire microcup array. The unexposed area are removed by a developer for the negative photoresist or the photocrosslinkable/photopolymerizable composition, filled with an electrophoretic fluid, and sealed by one of the sealing processes described above.

Figure 4A:
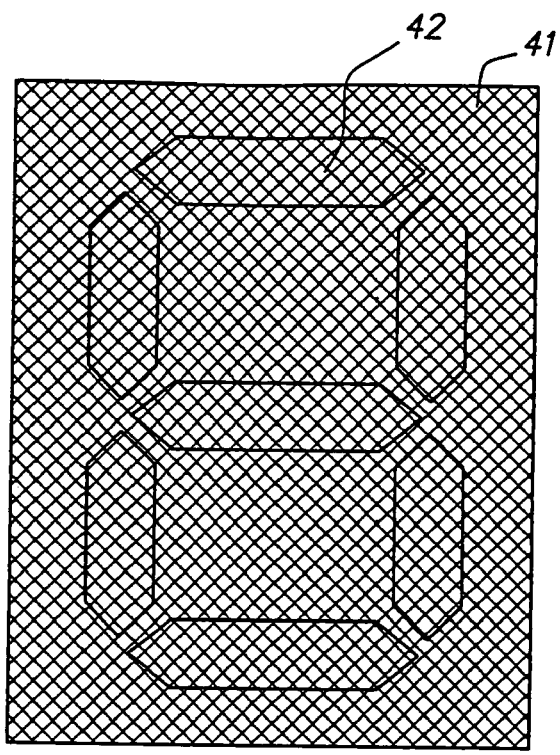
FIGS. 4A and 4B illustrate operation of an electrophoretic display the present invention.
Figure 4B:
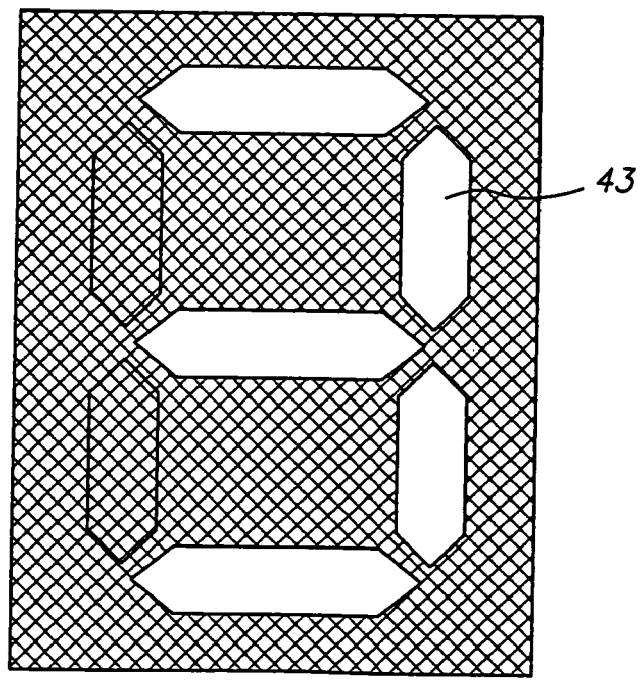

Because the pigment particles in the patterned area are charged, the particles move between the two electrode layers, according to the difference of the voltages applied to the electrode layers. For the purpose of illustration of FIGS. 4A and 4B, it is assumed that the cells in a patterned area are filled with white (Dmin) particles dispersed in a blue colored (Dmax) solvent and the non-patterned area on the viewing side is color-matched to the Dmax of the patterned area. As a result, when the white particles in the entire patterned area are on the non-viewing side, a blue background composed of the blue non-patterned area (41) and the blue patterned area (42) is seen by the viewer (FIG. 4A). However, when the particles move to the viewing side in selected areas (43) within the patterned area, the color of the particles in the selected areas (43) is seen thus creating a white-on-blue image seen by the viewer.

III. Electromagnetophoretic or Magnetophoretic Display

The patterned embossing and patterned filling methods and the sealing methods as described in Section II can be used to manufacture electromagnetophoretic segment displays except that the cells in the electromagnetophoretic display in the patterned area are filled with charged and magnetized pigment particles dispersed in a dielectric solvent or solvent mixture.

Figure 5:
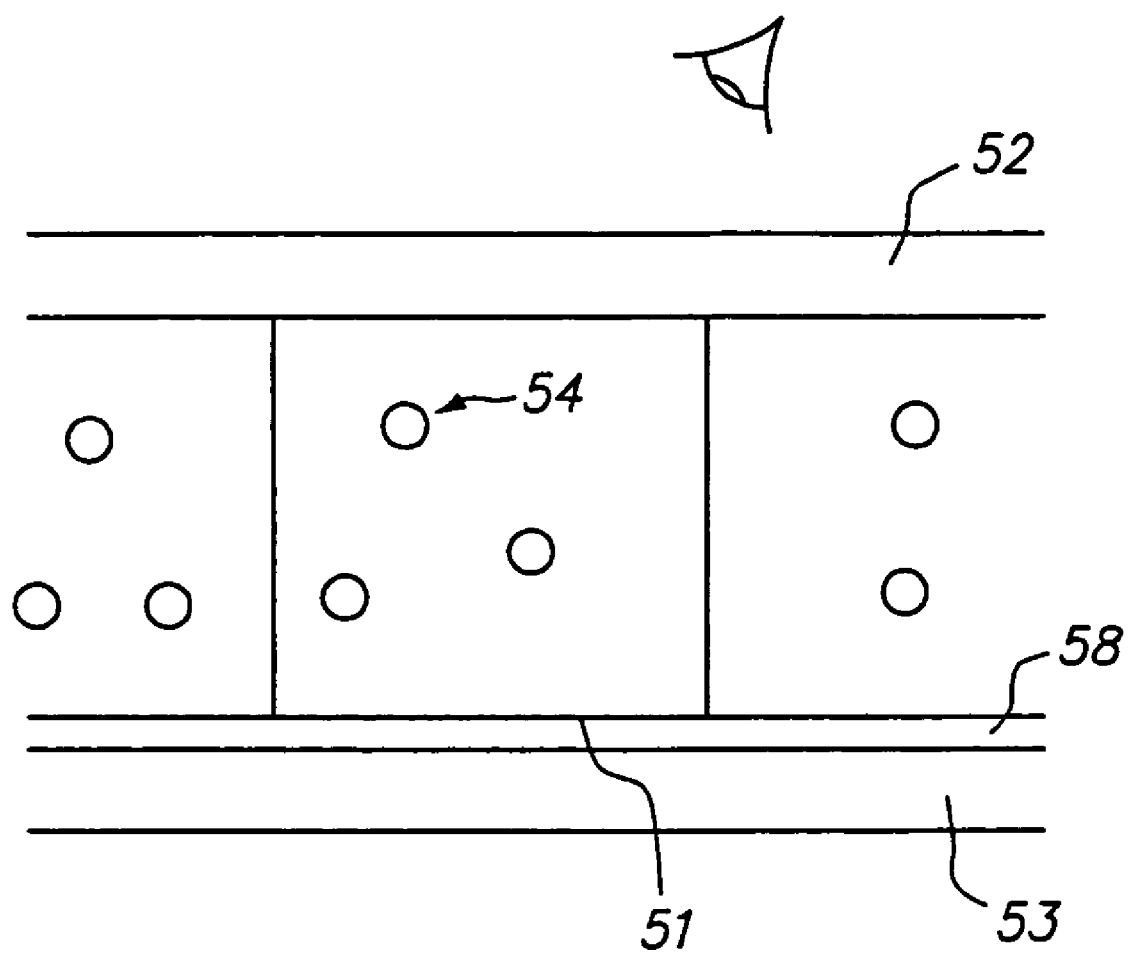
FIG. 5 illustrates an electromagnetophoretic display of the present invention.

FIG. 5 illustrates an embodiment of this type of display in which the cells in the patterned area are filled with white, charged magnetic particles (54) dispersed in a colored (or blackened) but clear solvent. A display cell (51) is sandwiched between two substrate layers (52 and 53). A patterned electrode layer (58) is placed between the cell (51) and one of the substrate layers. It is preferred that the substrate layer (52) without the patterned electrode layer is used in the embossing step and the substrate layer (53) with the electrode layer (58) is laminated with registration onto the patterned microcup arrays after the microcups are filled and sealed.

Preferably the substrate layer (52) is transparent and on the viewing side whereas the substrate layer (53) with the patterned electrode layer (58) is on the non-viewing side. A magnetic erasing means (such as magnetic eraser head or a manual magnetic eraser) may be placed on the non-viewing side. By applying the magnetic erasing means, the white particles are attracted to the non-viewing side, which, along with the non-patterned area which is color-matched to the Dmax of the patterned area, generates a colored background. In this design, an image may be created by either a magnetic writing means or an electric writing means on the viewing side. In the first scenario, when the magnetic writing means is applied, it attracts the white particles in selected areas within the patterned area to the viewing side thus creating a white-on-color image. In the second scenario, when the electric writing means is applied, an image may be created by applying appropriate voltages to the electric means and the electrode layer (58). For example, if the electrical writing means has polarity opposite from the particles and the electrode layer (58) has the same polarity as the particles, the white particles in selected areas inevitably migrate to the viewing side thus also generating a white-on-color image. Alternatively, the non-patterned area may be color matched to the Dmin of the patterned area.

For the sake of brevity, other alternative designs are not illustrated in detail. However it is understood that the electromagnetophoretic displays of the invention may include, but are not limited to, the following variations:

1) charged magnetic particles in a colored dielectric solvent
2) particles of two contrast colors one of which is magnetic and
   i) particles of only one color are charged; or
   ii) particles of both colors are charged; but carrying opposite charges or the same charge but of significantly different electrophoretic mobility;
3) color of the solvent in which the particles are dispersed;
4) an electric erasing means or magnetic erasing means;
5) the erasing means may be on the viewing or non-viewing side;
6) an electric writing means or a magnetic writing means; and
7) the writing means may be on the viewing or non-viewing side.

Alternatively, the cells in the patterned area are filled with magnetic particles (but not necessarily charged) dispersed in a solvent or solvent mixture. The particles may be metal or paramagnetic particles. The pigment particles dispersed in the solvent may also be magnetized by mixing or coating the pigment particles (such as $TiO_2$ particles) with magnetic particles. If the pigment particles are microencapsulated in a polymer matrix, the magnetic particles may be mixed with, or coated onto, the pigment particles before (preferred) or after the microencapsulation process. Suitable magnetic and paramagnetic particles include stainless steel, Fe—Co, Fe—Ni, Fe—Co—Ni, Ni—Co, Co—Cr and Fe—Co—V alloy particles. The magnetic particles may move between the viewing and the non-viewing side by a magnetic force.

EXAMPLES

Example 1

A. Preparation of the Inactive Colored Composition

TABLE 1

Inactive Colored Composition

| Component | Weight % | Source |
|---|---|---|
| EB 600 | 30.33 | UCB |
| SR 399 | 34.66 | Sartomer |
| HDDA | 15.60 | UCB |
| Irgacure 369 | 0.20 | Ciba |
| Irganox 1035 | 0.10 | Ciba |
| UVEXS-Blue | 2.82 | UVEXS |
| TiO2 R706 | 1.50 | Dupont |
| Solsperse 32500 | 0.090 | Avecia |
| OBGL | 1.50 | Orasle |

Solution (a):

33.2 Grams of EB 600 (acrylated epoxy oligomer, UCB, Smyrna, Ga.), 36.8 gm of SR 399 (dipentaerythritol pentaacrylate, Sartomer, Exton, Pa.) and 11.22 gm of HDDA (UCB, Smyrna, Ga.) were added into a 150 gm bottle and the mixture was stirred at 500 RPM for 30 min.

Solution (b):

0.2 Gram of Irgacure 369 (Ciba, Tarrytown, N.Y.), 0.1 gm of Irganox 1035 (Ciba, Tarrytown, N.Y.), 2.82 gm of UVEXS-blue (Ultraviolet Exposure System, Sunnyvale, Calif.) and 1.5 gm Orasol Blue GL (Ciba, Tarrytown, N.Y.) were added into a bottle containing 10 gm of methylethylketone (Fisher, Pittsburgh, Pa.) and the mixture was shaken for 30 min.

Solution (c):

6 Grams of methyl ethyl ketone was added into a 20 ml glass vial. To the glass vial, 0.09 gm of Solsperse 32500 (Avecia, Charlotte, N.C.) was added. The mixture was shaken for 10 min, after which 1.5 gm of $TiO_2$ (R706, Dupont, Wilmington, Del.) was added and the final mixture was homogenized (PowerGen 700, Fisher, Pittsburgh, Pa.) at the speed setting of 6 for 45 min.

Solution (b) and Solution (c) prepared above were then added to Solution (a) and the mixture was stirred at 500 RPM for 10 min to form the inactive colored composition. The color (blue) of the composition matched the color of the electrophoretic fluid containing a perfluorinated Cu-phthalocyanine dye (FC-3275, from 3M Co.).

B. Screen Printing of the Inactive (Non-Patterned) Area

A screen printing mask of 300 mesh having a dimension of 1.5"×3.75" was used in this experiment. On the screen, the segment-patterned area (such as the 7-segment pattern in FIG. 1) was masked.

The screen was then placed on top of a 4"×4" microcup sheet prepared on top of a 5 mil ITO film, according to the procedure as described in WO01/67170. Three grams of the inactive composition prepared above was added on top the silk screen. The composition was squeezed and selectively filled into the microcups through the screen in the non-patterned area because the segment-patterned area was masked.

The screen was subsequently removed and the filled microcups were dried and passed through a UV curing conveyer (DDU, Los Angles, Calif.) with the line speed of 10 ft/min. The UV dosage applied was 1 J/cm2 under a nitrogen blanket. In this step, the microcups in the segment-patterned area remained empty (i.e., not filled with an electrophoretic composition).

C. Preparation of $TiO_2$ Microparticles 5.9 Gram of $TiO_2$ R900 (DuPont) was added to a solution consisting of 3.77 g of MEK, 4.54 g of N3400 aliphatic polyisocyanate (Bayer AG) and 0.77 g of 1-[N,N-bis(2-hydroxyethyl)amino]-2-propanol (Aldrich). The resultant slurry was homogenized for 1 minute at 5-10° C., to which 0.01 g of dibutyltin dilaurate (Aldrich) was added and homogenized for an additional minute. A solution containing 20 g of HT-200 and 0.47 g of Rf-amine4900 [which is a condensate of Krytox methyl ester (from Du Pont) and tris (2-aminoethyl)amine prepared according to the reaction below] was added and homogenized again for 3 more minutes at room temperature.

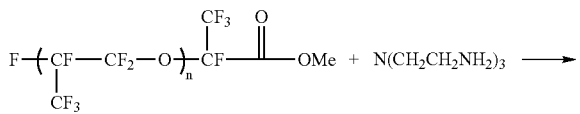

-continued

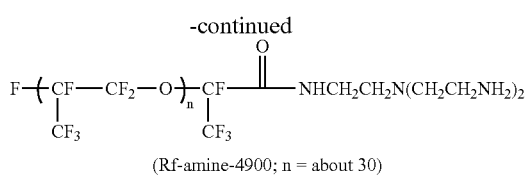

(Rf-amine-4900; n = about 30)

The slurry prepared above was added slowly over 5 minutes at room temperature under homogenization into a mixture containing 31 g of HT-200 and 2.28 g of Rf-amine4900. The resultant $TiO_2$ microcapsule dispersion was stirred under low shear by a mechanical stirrer at 35° C. for 30 minutes, then heated to 85° C. to remove MEK and post cure the internal phase for three hours. The dispersion showed a narrow particle size distribution ranging from 0.5-3.5 microns. The microcapsules were separated by centrifugal, diluted and redispersed in HT-200.

D. Filling and Sealing of the Microcups in the Patterned Area

One gram of an electrophoretic composition was added into the microcups in the patterned area with a smoothing bar. The electrophoretic composition contains 6 parts (based on dry weight) of the $TiO_2$ microparticles as prepared above and 94 parts of a HT-200 (perfluorinated polyether, from Ausimont, Thorofare, N.J.) solution containing 1.5 wt % of a perfluorinated Cu-phthalocyanine dye (FC-3275, from 3M). The filled microcups were then sealed with a sealing composition using a 6 mil coating knife.

The sealing composition used was a 10% rubber solution consisting of 9 parts of Kratone G1650, 1 part of GRP 6919, 3 parts of Carb-O-Sil TS-720 (from Cabot Corp., Ill.), 78.3 parts of Isopar E and 8.7 part of isopropyl acetate was overcoated onto the partially filled microcups by a Universal Blade Applicator and dried at room temperature to form a seamless sealing layer of about 2-3 μm thickness (dry) with good uniformity.

E. Lamination

An ITO/PET conductor film (from CPFilms, Inc., Martinsville, Va.) having via holes on active segments and connecting traces to driver circuitry on the opposite side was overcoated with 6 □m of a pressure sensitive adhesive (Durotak 1105 from National Starch, Bridgewater, N.J.) and laminated with registration onto the sealed, segmented microcups using a GBC Eagle 35 laminator (GBC, Northbrook, Ill.) with the setting of roll temperature at 85° C., lamination speed at 1 ft/min and roll gap of 1 mm.

The active ITO segments had the same pattern as that of the microcup array. The resultant segment EPD showed acceptable switching performance and no visible trace to the viewer.

Example 2

This example was carried out to demonstrate an alternative way to prepare the display of the present invention.

In this experiment, the microcups were prepared by microembossing of a thermoplastic composition coated on a 5-mil ITO/PET as the carrier substrate, according to the procedure as described in WO01/67170. All microcups on a 4"×4" sheet were then filled with 3 gm of the inactive composition prepared according to Example 1. The filled microcups were covered with a 3M Fluoropolymer release Mylar 5932 (3M, St. Paul, Minn.) and passed through a laminator GBC Eagle 35 (GBC, Northbrook, Ill.). The laminator was set at the roll temperature of 75° C., lamination speed of 1 ft/min and roll gap of 3 mm.

A negative photo mask was then placed on top of the microcups. The photomask had a masked 7-segment pattern. When exposed to the UV light, microcups in the masked patterned area were not cured by the UV light and the non-cured inactive composition was rinsed away with a solvent mixture of cyclohexanone/ethanol (ratio of 6:4) at room temperature for 1 minute.

The emptied microcups in the patterned area were then filled with the electrophoretic composition, sealed and laminated according to Example 1.

While the present invention has been described with reference to the specific embodiments thereof, it should be understood that various changes may be made and equivalents may be substituted without departing from the true spirit and scope of the invention. In addition, many modifications (for example, operating steps) may be made to adapt to a particular situation. All such modifications are intended to be within the scope of the claims appended hereto.

What is claimed is:

1. A display comprising a display cell layer, wherein the display cell layer comprises a patterned area and a non-patterned area, and
   (a) said patterned area comprises electrophoretic cells which are filled with an electrophoretic fluid comprising charged pigment particles dispersed in a solvent or solvent mixture, and said patterned area is capable of displaying two contrast colors; and
   (b) said non-patterned area does not comprise electrophoretic cells and is color matched to one of the two contrast colors.

2. The display of claim 1 wherein said electrophoretic cells are microcups formed by an embossing or lithographic process.

3. The display of claim 1 which is an electrophoretic display.

4. The display of claim 1 which is an electromagnetophoretic display wherein said electrophoretic fluid further comprises magnetized particles.

5. The display of claim 1 wherein each of said filled electrophoretic cells is sealed by a sealing layer on the top surface of the electrophoretic fluid.

6. The display of claim 5 wherein said sealing layer forms a contiguous film on the electrophoretic fluid and is in intimate contact with both the electrophoretic fluid and the surface of walls of said electrophoretic cells that are not covered by the electrophoretic fluid.

7. The display of claim 6 wherein said sealing layer extends over the top surface of said walls of the electrophoretic cells.

8. The display of claim 5 wherein said sealing layer is formed from a sealing composition.

9. The display of claim 8 wherein said sealing composition has a specific gravity lower than that of the electrophoretic fluid.

10. The display of claim 5 wherein said sealing layer is being hardened when in contact with the electrophoretic fluid.

11. A process for the manufacture of an electrophoretic display comprising a display cell layer, wherein the display cell layer comprises a patterned area and a non-patterned area, the process comprises the following steps:
    a) forming microcups in the patterned area, but not in the non-patterned area;

b) filling the microcups with an electrophoretic fluid wherein said patterned area is capable of displaying two contrast colors; and c) color matching the non-patterned area to one of the two contrast colors.

12. The process of claim 11 wherein said microcups are sandwiched between two electrode layers.

13. The process of claim 12 wherein one of said two electrode layers is patterned.

14. The process of claim 13 wherein said patterned electrode layer has the same pattern as the pattern of the patterned area and is laminated with registration onto the microcups.

15. The process of claim 11 further comprising sealing the filled microcups with a sealing layer on the top surface of the electrophoretic fluid.

16. The process of claim 15 wherein said sealing layer is formed from a sealing composition having a specific gravity lower than that of said electrophoretic fluid.

17. The process of claim 15 wherein said sealing layer is formed by hardening a sealing composition when in contact with the electrophoretic fluid.

18. A process for the manufacture of an electromagnetophoretic display comprising a display cell layer, wherein the display cell layer comprises a patterned area and a non-patterned area, the process comprises the following steps:

a) forming microcups in the patterned area, but not in the non-patterned area;

b) filling the microcups with an electromagnetophoretic fluid wherein said patterned area is capable of displaying two contrast colors; and c) color matching the non-patterned area to one of the two contrast colors.

19. The process of claim 18 wherein said microcups are sandwiched between a substrate layer and an electrode layer.

20. The process of claim 19 wherein said substrate layer comprises a second electrode layer placed between the microcups and the substrate layer.

21. The process of claim 18 further comprising sealing the filled microcups with a sealing layer on the top surface of the electromagnetophoretic fluid.

22. The process of claim 21 wherein said sealing layer is formed from a sealing composition having a specific gravity lower than that of said electromagnetophoretic fluid.

23. The process of claim 21 wherein said sealing layer is formed by hardening a sealing composition when in contact with the electromagnetophoretic fluid.

* * * * *